(12) United States Patent
Ashida et al.

(10) Patent No.: US 6,725,958 B2
(45) Date of Patent: Apr. 27, 2004

(54) SNOWMOBILE

(75) Inventors: Takashi Ashida, Shizuoka (JP); Mamoru Atsuumi, Shizuoka (JP)

(73) Assignee: Yamaha Hatsudoki Kabushiki Kaisha (JP)

(*) Notice: Subject to any disclaimer, the term of this patent is extended or adjusted under 35 U.S.C. 154(b) by 0 days.

(21) Appl. No.: 10/094,748

(22) Filed: Mar. 8, 2002

(65) Prior Publication Data

US 2002/0134603 A1 Sep. 26, 2002

(30) Foreign Application Priority Data

Mar. 9, 2001 (JP) ........................................ 2001-065935

(51) Int. Cl.[7] .............................................. B62M 27/02
(52) U.S. Cl. ........................ 180/186; 180/182; 180/9.1; 123/196 R; 123/195 R
(58) Field of Search .................. 180/9.1, 9.25, 180/9.44, 186, 190, 182, 192; 123/195 R, 196 R, 198 R (56) References Cited

U.S. PATENT DOCUMENTS

| | | | | |
|---|---|---|---|---|
| 4,334,508 A | 6/1982 | Sasaki | ................... | 123/195 A |
| 4,606,310 A | 8/1986 | Makino | ................... | 123/192 B |
| 4,903,483 A | 2/1990 | Atsuumi et al. | ............... | 60/313 |
| 4,960,081 A | 10/1990 | Atsuumi | ................... | 123/41.31 |
| 4,993,374 A | 2/1991 | Okui | ........................ | 123/90.31 |
| 5,024,088 A | 6/1991 | Komatsu et al. | .......... | 73/517 B |
| 5,078,105 A | 1/1992 | Ito et al. | ................... | 123/195 B |
| 5,113,807 A | 5/1992 | Kobayashi | ................ | 123/41.74 |
| 5,184,582 A * | 2/1993 | Okui et al. | ............... | 123/90.31 |
| 5,195,479 A * | 3/1993 | Hasetoh et al. | .......... | 123/195 A |
| 5,240,088 A * | 8/1993 | Okui et al. | .................. | 180/297 |
| 5,662,080 A | 9/1997 | Isono et al. | ............. | 123/195 C |
| 5,687,690 A * | 11/1997 | Kamiyama et al. | ..... | 123/198 R |
| 5,860,402 A | 1/1999 | Sakurai et al. | .......... | 123/196 C |
| 6,186,109 B1 * | 2/2001 | Matsuno | ................... | 123/192.1 |
| 6,196,166 B1 | 3/2001 | Yonezawa | ................ | 123/41.01 |
| 6,227,323 B1 | 5/2001 | Ashida | ........................ | 180/190 |
| 6,314,934 B1 * | 11/2001 | Ito et al. | ................. | 123/196 R |
| 6,332,444 B1 * | 12/2001 | Narita et al. | ............. | 123/196 R |
| 6,354,389 B1 * | 3/2002 | Zaczkowski et al. | ...... | 180/9.54 |
| 6,510,912 B1 * | 1/2003 | Atsuumi | .................... | 180/69.1 |

\* cited by examiner

*Primary Examiner*—Lesley D. Morris
*Assistant Examiner*—L. Lum
(74) *Attorney, Agent, or Firm*—Knobbe, Martens, Olson & Bear LLP (57) ABSTRACT

A snowmobile has an engine with a compact arrangement that includes a crankshaft, an output shaft, and an auxiliary shaft. The crankshaft extends along a first axis, the output shaft extends along a second axis, and the auxiliary shaft extends along a third axis. Two of the first axis, the second axis, and the third axis are disposed in a common plane. The other of the first axis, the second axis, and the third axis is offset from the common plane.

16 Claims, 8 Drawing Sheets

SNOWMOBILE

RELATED APPLICATIONS

This application is based upon and claims the priority of Japanese Patent Application No. 2001-065935, filed on Mar. 9, 2001, which is hereby incorporated by reference in its entirety.

BACKGROUND OF THE INVENTION

1. Field of the Invention

The present invention generally relates to an engine for land vehicles. More specifically, the present invention relates to an improved engine layout for snowmobiles that results in a smaller overall vehicle body.

2. Description of the Related Art

Snowmobiles are powered by internal combustion engines that are mounted within a substantially enclosed engine compartment forward of the rider's seat. The engine compartment typically is defined within a cowling and is generally relatively small. Two-cycle engines having a generally transverse orientation have been used in snowmobiles. Such engines generally have a crankshaft, an output shaft and an auxiliary shaft longitudinally spaced from one another. In some configurations, the shafts are arranged in the same horizontal plane such that the shafts are seemingly stacked side-by-side.

Four-cycle engines provide various benefits and are therefore being incorporated into more vehicles. For example, four-cycle engines provide better engine fuel economy and engine control and less exhaust emissions. In order to increase the output power of the four-cycle engine, however, greater piston displacement is often used. This, along with size and location of the valve gear and cam mechanisms, increases the height of the engine, and hence the height of the snowmobile. While the crankshaft, output shaft, and auxiliary shaft could be lowered to counteract the increased height of the snowmobile, the shafts would then interfere with the steering mechanisms associated with the front skis.

SUMMARY OF THE INVENTION

Thus, a four-cycle engine layout that can reduce the engine compartment volume needed to house the engine is desired. Additionally, the engine layout preferably lowers the center of gravity of the engine, while remaining simply constructed.

Accordingly, one aspect of the present invention involves a snowmobile that includes a frame assembly that has a longitudinal axis. An internal combustion engine is mounted generally transversely to the frame assembly. The snowmobile also has a steering linkage mounted to the frame assembly. The engine includes a cylinder bore and a piston reciprocally positioned in the cylinder bore. The piston drives a crankshaft of the engine. The crankshaft is mounted in a crankcase that has a vertical transverse center plane. The crankshaft extends along a first axis. The crankshaft is arranged to drive an output shaft that is mounted in the crankcase. The output shaft extending along a second axis that is generally parallel to said first axis. The output shaft is arranged to drive the vehicle through a transmission. The internal combustion engine also includes an auxiliary shaft arranged to drive an oil pump to deliver lubricating oil to at least one component of the engine. The auxiliary shaft extends along a third axis that is generally parallel to said first axis. Two of the first axis, the second axis, and the third axis are disposed in a common plane. The other of the first axis, the second axis, and the third axis is offset from the common plane.

Another aspect of the present invention involves a snowmobile that includes a frame assembly that has a longitudinal axis and an internal combustion engine mounted generally transversely to the frame assembly. The engine includes a cylinder bore and a piston reciprocally positioned in said cylinder bore. The piston drives a crankshaft of the engine that is mounted in a crankcase having a vertical transverse center plane. The crankshaft is drives an output shaft that is mounted in the crankcase. The output shaft drives the vehicle through a transmission. The engine also includes a starter motor and a lubrication system. The lubrication system includes an oil cooler, an oil filter, and an oil pump to deliver lubricating oil to at least one component of the engine. The oil pump and the output shaft are located on one side of the transverse center plane. The oil filter, the oil cooler, and the starter motor are located on the other side of the transverse center plane.

Another aspect of the present invention involves a snowmobile that includes a frame assembly that has a longitudinal axis and an internal combustion engine mounted generally transversely to the frame assembly. The engine includes a cylinder bore and a piston reciprocally positioned in the cylinder bore. The piston drives a crankshaft of the engine. The crankshaft is mounted in a crankcase having a vertical transverse center plane. The crankshaft comprises at least one crank web and driving a drive gear. The crankshaft is mounted in a crankcase that has a vertical transverse center plane. The crankshaft is arranged to drive an output shaft through the drive gear, the output shaft being mounted in the crankcase. A driven gear mounted on said output shaft is driven by the drive gear. The engine also comprises a damper mounted on said output shaft and a valvetrain. The valvetrain includes a flexible transmitter that causes a plurality of valves to be actuated. The damper is positioned between said drive gear and said crank web. The damper is also located at least partially positioned in a plane that is normal to an axis of rotation of the crankshaft and that includes a portion of the flexible transmitter.

BRIEF DESCRIPTION OF THE DRAWINGS

These and other features, aspects and advantages of the present invention will be better understood with reference a preferred embodiment, which is illustrated in the accompanying drawings. The illustrated embodiment is merely exemplary and is not intended to define the outer limits of the scope of the present invention. The drawings of the illustrated arrangement comprise eight figures.

DETAILED DESCRIPTION OF THE PREFERRED EMBODIMENT

Figure 1:
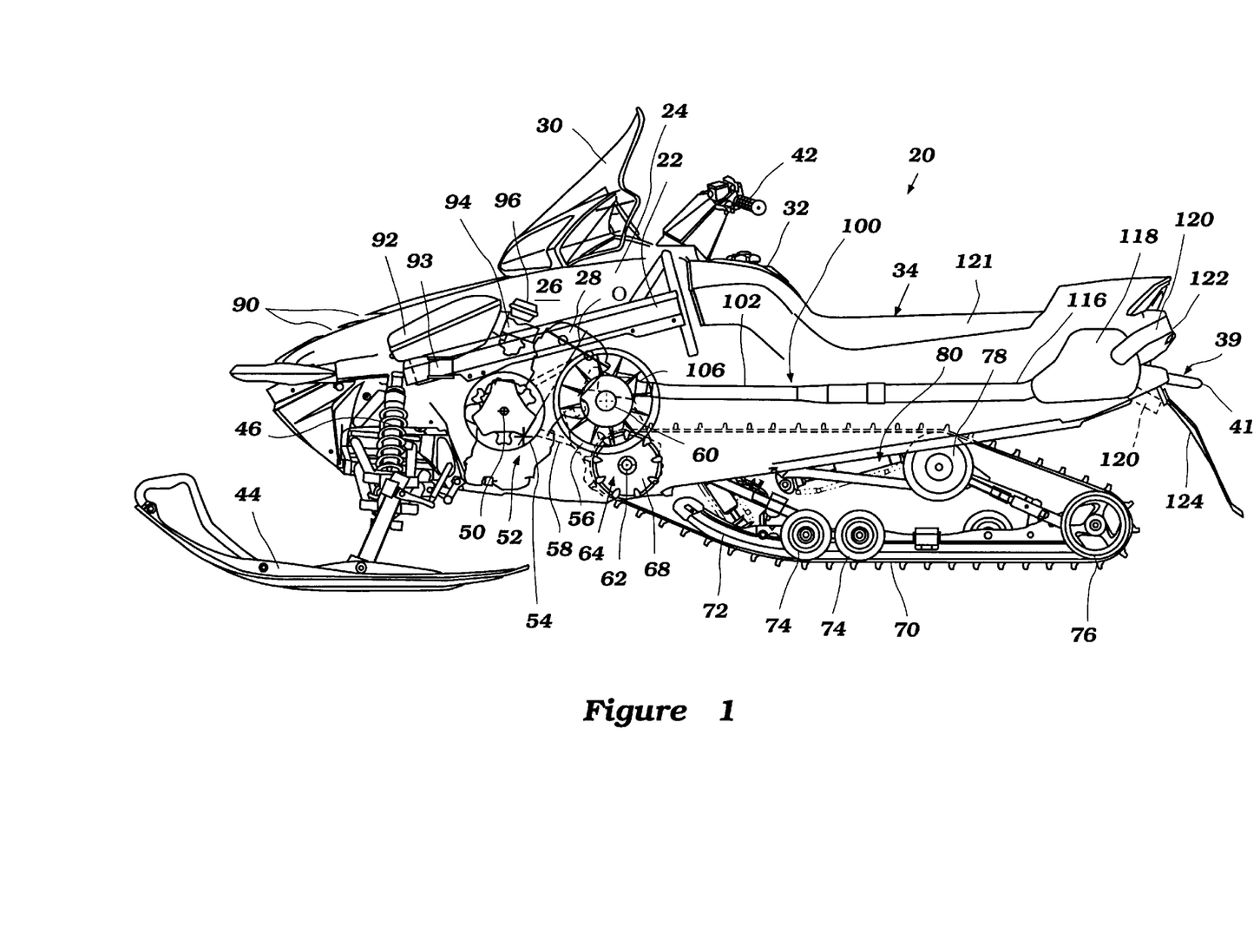
FIG. 1 is a side elevation view of a snowmobile with certain portions broken away and other internal portions shown in hidden line to better illustrate certain features, aspects and advantages of the present invention.

With reference now to FIG. 1, a snowmobile having certain features, aspects and advantages of the present invention will be described. The snowmobile, indicated generally by the reference numeral 20, is an environment for which many features, aspects and advantages of the present invention have been specially adapted. Nevertheless, certain features, aspects and advantages of the present invention can be used with other vehicles, such as all-terrain vehicles and watercraft.

The snowmobile 20 generally comprises a frame assembly 22 (see FIG. 8) that carries a number of other components of the snowmobile 20. A forward body cover 24 is disposed over a forward portion of the frame assembly 22. The forward body cover 24 defines, in part, an engine compartment 26 in which an engine 28 is mounted. The engine 28 is mounted to the frame assembly 22 in a manner described below in connection with FIGS. 7 and 8. The engine 28 will be described in greater detail below in connection with FIGS. 2–8.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to blend together for aesthetic reasons.

Rearward of the fuel tank 32, a seat 34 is mounted to the frame assembly 22. Rearward of the seat 34 is positioned a grab bar 39 that comprises a grabbing portion 41 that can be used to raise a rear portion of the snowmobile for turning and maneuvering when the snowmobile is not being ridden. While the illustrated grab bar 39 is generally U-shaped and is mounted in a generally horizontal manner, other forms of grab bars can be used. For instance, the grab bar 39 can be loops, semicircular, vertical or inclined in orientation. In short, any suitable grab bar construction can be used.

Forward of the seat 34 and the fuel tank 32 is a steering handle assembly 42. The handle assembly 42 can carry appropriate controls and can be coupled to a pair of front skis 44 as described in more detail in connection with FIGS. 7 and 8. Manipulation of the handle assembly 42 causes the direction of the snowmobile 20 to be altered, as will be discussed in more detail below. The skis 44 are mounted to the frame assembly 22 though a front suspension assembly 46. Any suitable front suspension assembly 46 can be used.

The engine 28 in the illustrated arrangement is an inclined L-4 four-cycle engine that is mounted transversely within the engine compartment 26. In other words, the illustrated engine 28 comprises four cylinder bores that extend side-by-side across a width of the snowmobile 20. The cylinder bores each comprise a center axis O that is inclined relative to vertical. In some arrangements, engines having differing numbers of cylinder bores, different cylinder bore configurations (e.g., V, opposing, etc.), different orientations (e.g., vertical) and different operating principles (e.g., two-stroke, rotary, etc.) can be used.

Figure 3:
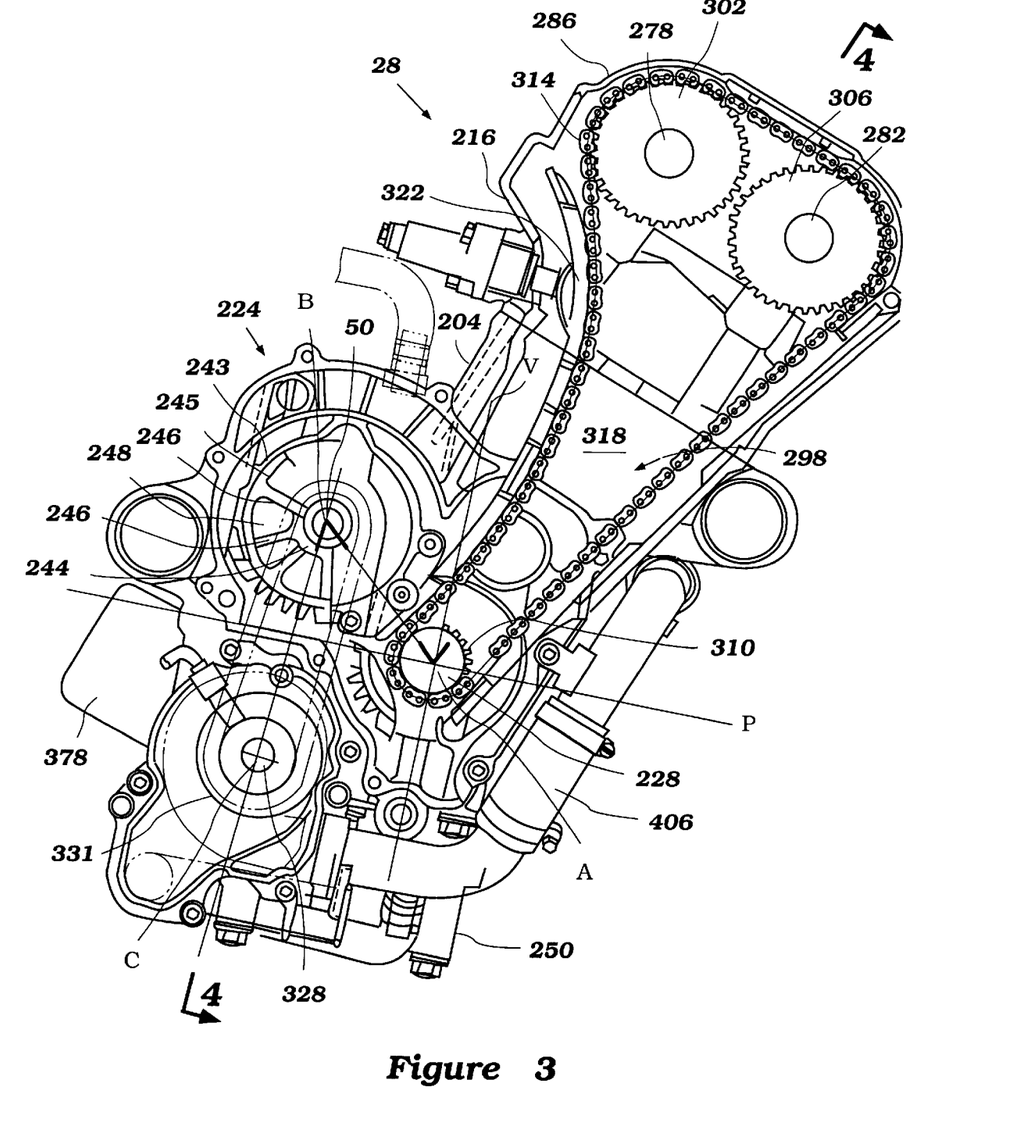
FIG. 3 is a side view of the engine illustrated in FIGS. 1 and 2 with a cam chamber cover, a coolant pump cover and a crankshaft cover removed.

The engine 28 also comprises an output shaft 50, which has an axis of rotation "B" (see FIG. 3). The output shaft 50 drives a transmission, which is a continuously variable transmission 52 in the illustrated arrangement. Other transmissions also can be used. In the illustrated arrangement, the output shaft 50 rotates a drive pulley 54. The output shaft 50 and the drive pulley 54 can be connected together through a clutch, a centrifugal clutch, a sprag clutch or can be directly connected together.

The drive pulley 54 powers a driven pulley 56 with a v-belt 58 in the illustrated arrangement. In some configurations, a drive chain can be used in place of the v-belt 58. Other arrangements also can be used. The driven pulley 56 is connected to and rotates about a transfer shaft 60. In the illustrated arrangement, the transfer shaft 60 carries a sprocket (not shown) at the end opposite to the driven pulley 56. The sprocket is connected to a further sprocket that is carried by a drive shaft 62.

The drive shaft 62 powers a drive unit 64. The drive unit 64 generally comprises a plurality of drive wheels 68. The drive wheels 68 provide a motive force to a drive belt 70, which is commonly used in the snowmobile industry.

With continued reference to FIG. 1, the drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly with a rear suspension system 80. Any suitable rear suspension system 80 can be used and certain portions of the rear suspension system 80 have been schematically illustrated in the illustrated arrangement.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

With continued reference to FIG. 1, air is drawn into the engine compartment 26 through suitable air passages. In some arrangements, the air is drawn through ventilation openings 90 formed in the body cover 24. The air drawn or forced into the engine compartment 26 circulates about the engine 28 and related drive components to help cool the engine 28 and the related drive components.

The air also is drawn into an air intake box 92. The air intake box 92 is disposed forward of the engine 28 in the illustrated arrangement. The air intake box 92 can be mounted to the frame assembly 22 in a manner that will be described. An air inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28 rather than wrapping around the engine 28 and mating with a rearward-facing surface of the engine 28. The charge formers 96 preferably correspond to each cylinder bore. In some arrangements, a single charge former can be used upstream of a separation point for runners extending to individual cylinder bores. In addition, in the illustrated arrangement, the engine 28 is carbureted. In some arrangements, the charge formers 96 can be fuel injectors that are mounted for direct injection, indirect injection or port injection. The air-fuel charge provided in this manner is combusted within the engine as discussed in more detail below.

The combustion byproducts then are exhausted through a suitable exhaust system 100. In the illustrated arrangement, the exhaust system 100 extends directly rearward from the engine 28. In this manner, an exhaust runner 102 that extends rearward from the engine can be tuned to the engine for improved engine performance. Additionally, the length of each runner 102 can be lengthened prior to merging together with any other runners such that pulse effects on adjoining cylinder bores can be reduced. In some arrangements, an attenuation chamber or passage between two or more runners can be used to reduce the effect of reflected pressure pulses in the exhaust system.

With continued reference to FIG. 1, the exhaust system 100 preferably comprises the exhaust runners 102 that correspond to each cylinder bore and that extend generally rearward from the engine. Each exhaust runner 102 is coupled to an exhaust discharge pipe 106 that is individually joined to the engine in the illustrated arrangement. In some arrangements, a single manifold can be used. At least two of the runners 102 join at a merge location (not shown) and the merged flow passes through a manifold pipe 116.

The manifold pipes 116 extend rearward to a silencer box 118. The silencer box 118 provides an enlarged volume into which the exhaust can flow. Exhaust energy is dissipated within the silencer box 118 and the noise level of the exhaust can be decreased. In the illustrated arrangement, the silencer box 118 is disposed below a portion of the seat 34 that is rearward of a rider section 121 of the seat.

A pair of exhaust pipes 120 extends rearward from the silencer box 118. In some arrangements, a single exhaust pipe 120 can extend from the silencer box 118. Other numbers of exhaust pipes also can be used. One end of each of the exhaust pipes 120 preferably defines an ultimate exhaust discharge 122 from the snowmobile 20 such that the exhaust gases are discharged into the atmosphere at this location. As illustrated in FIG. 1, the exhaust pipes 120 can extend upwardly and rearwardly from the silencer box 118 while, in another arrangement, shown in hidden lines, the exhaust pipes 120 can extend downward to a location forward of a protective flap 124. Preferably, the exhaust pipes 120 terminate at a location forward of the grab portion 41 of the grab bar 39.

With reference now to FIGS. 2–8, the engine 28 of the illustrated snowmobile 20 will be described in greater detail. The engine 28 includes a cylinder block 204 that defines four combustion bores 208 spaced from each other transversely across the snowmobile 20. As mentioned above, each of the cylinder bores 208 has a cylinder bore axis O that is slanted or inclined at an angle from a vertical plane T that is transverse to the snowmobile 20 so that the engine 28 can be shorter in height (see FIG. 7). The cylinder bore axis O is the same for each of the cylinder bores 208 in the illustrated embodiment.

Pistons 212 reciprocate within the cylinder bores 208. A cylinder head 216 is affixed to the upper end of the cylinder block 204 to close respective upper ends of the cylinder bores 208 and thus define combustion chambers 220 with the cylinder bores 208 and the pistons 212.

Figure 2:
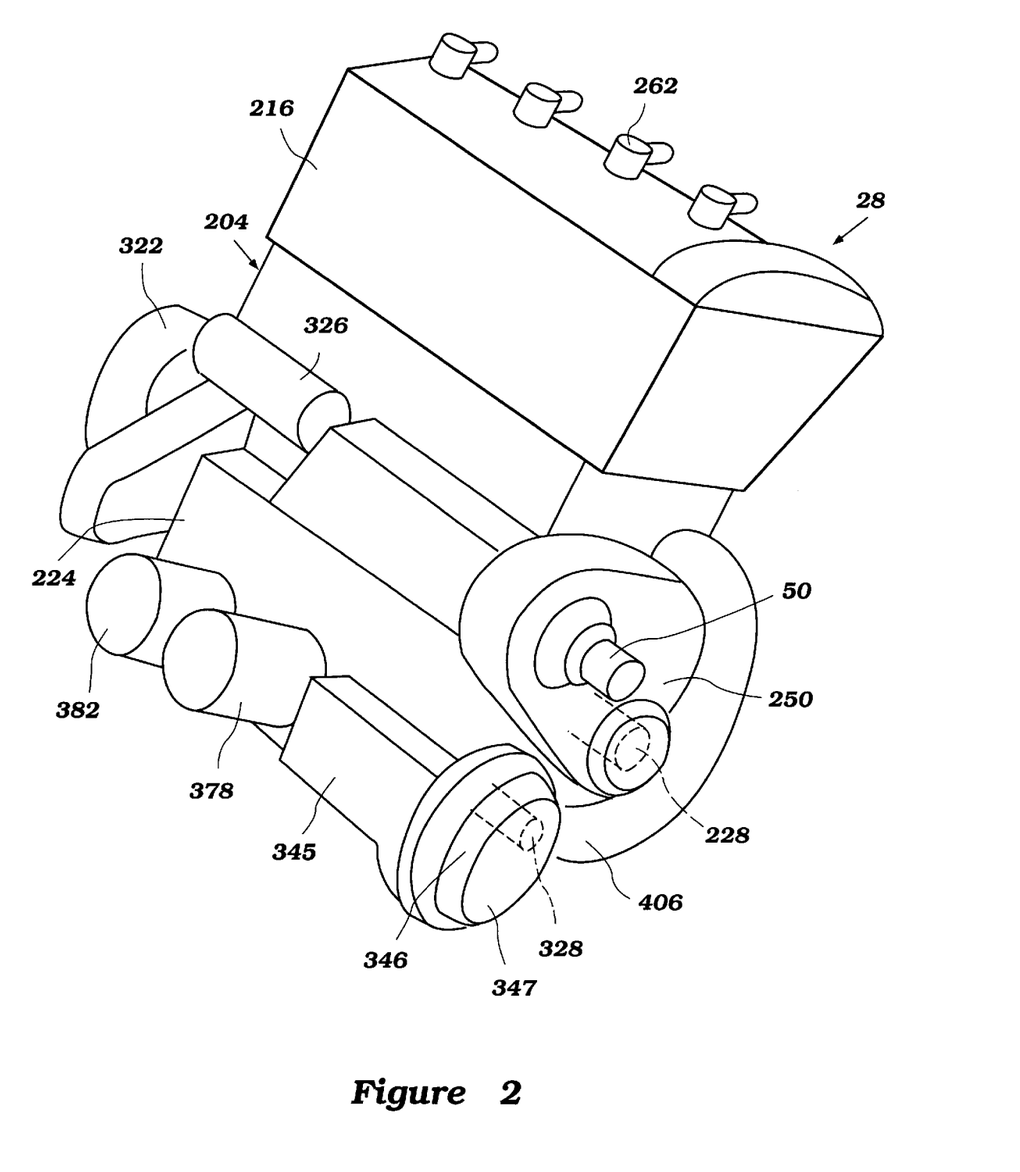
FIG. 2 is a schematic top, front, and side perspective view of an engine of the snowmobile of FIG. 1.
Figure 4:
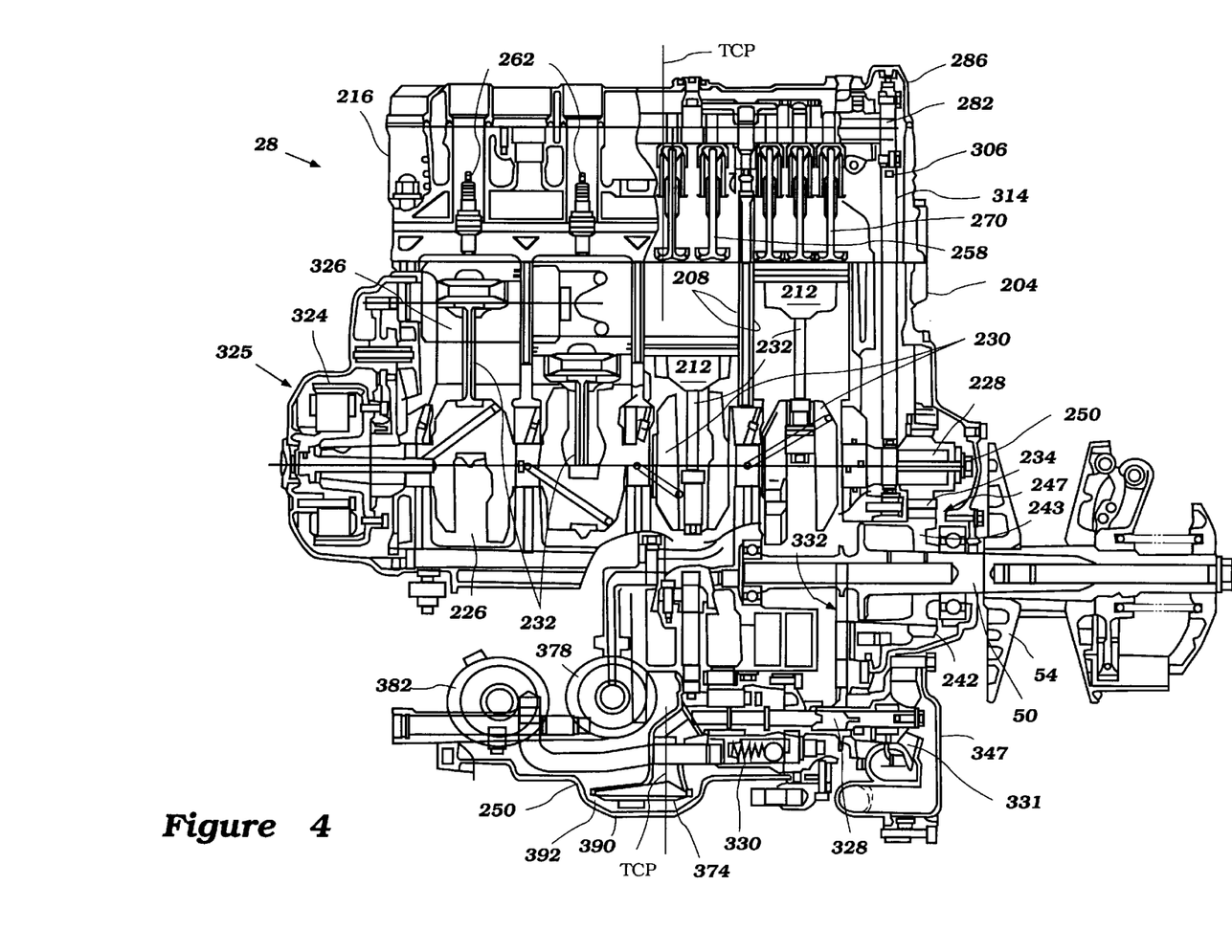
FIG. 4 is a partial section view of the engine of FIG. 2 taken along line 4—4 in FIG. 3.

With reference to FIG. 2, a crankcase member 224 is affixed to the lower end of the cylinder block 204 to define a crankcase chamber 226. Line P—P illustrates that the crankcase member 224 can comprise an upper portion 225 and a lower portion 227 (see FIGS. 3 and 5). With reference to FIG. 4, a crankshaft 228 having a throw defined, in part, by two adjacent crank webs 230 is rotatably connected to the pistons 212 through the connecting rods 232. That is, the connecting rods 232 are rotatably coupled with the pistons 212 and with the throws of the crankshaft 228. The crankshaft 228 is also journaled in the crankcase member 224 by bearings (not shown). The crankshaft 228 also has an axis of rotation "A," shown in FIG. 3. The axis "A" is generally parallel to the axis "B."

With reference to FIG. 4, the engine 28 has an imaginary generally vertical transverse center plane TCP. This plane TCP preferably extends through a location about halfway between the two ends of the cylinder head 216.

A drive gear 234 is mounted proximate an end of the crankshaft 228. A driven gear 242 is mounted proximate an end of the output shaft 50. Both the drive gear 234 and the driven gear 242 are provided on the same side of the plane TCP. A crankshaft cover 250 is provided on a side of the crankcase member 224 that covers the crankshaft 228, the drive gear 234, and the driven gear 242. The driven gear 242 is mounted on a rotor 243 that is mounted on the output shaft 50. The rotor 243 includes an inner ring 244 that is mounted on the output shaft 50 and an outer ring 245 on which the drive gear 242 is mounted. A plurality of blades 246 extend radially outward from the inner ring 244 to the outer ring 245. The drive gear 234 is smaller than the driven gear 242 and, thus, a gear reduction pair 247 is formed. The crankshaft 228 of the engine 28 thus drives the output shaft 50 at an angular speed which is less than angular speed of the crankshaft 228 by an amount determined by the gear reduction 247.

A damper 248 is also mounted on the output shaft 50 proximate the driven gear 242. In one embodiment, the damper 248 is a compressible material that is compressed and then wedged between a pair of adjacent blades 58. In another embodiment, the damper 248 is located on the inner side of the driven gear 242, i.e., at a position at least partially between the outer-most crank web 230 and the driven gear 242 (see FIGS. 4 and 6). The damper 248, being compressible, can absorb some of the initial torque applied by the crankshaft 228 to the output shaft. By absorbing some of the torque applied in this manner, the damper 248 makes the transfer of rotational motion between these two shafts smoother. This, in turn, improves the smoothness of the transmission 52, which also improves the ride of the snowmobile 20.

The cylinder block 204, the cylinder head member 216, the crankshaft cover 250 and the crankcase member 224 together define an engine body 252. The engine body 252 preferably is made of an aluminum-based alloy. In the illustrated embodiment, the engine body 252 is oriented in the engine compartment 26 so as to position the crankshaft 228 generally perpendicular to a vertical center plane VCP of the snowmobile 20 (see FIG. 8) such that the crankshaft 228 extends generally in the transverse direction. Other orientations of the engine body, of course, are also possible (e.g., with a longitudinal or vertically-oriented crankshaft).

Figure 5:
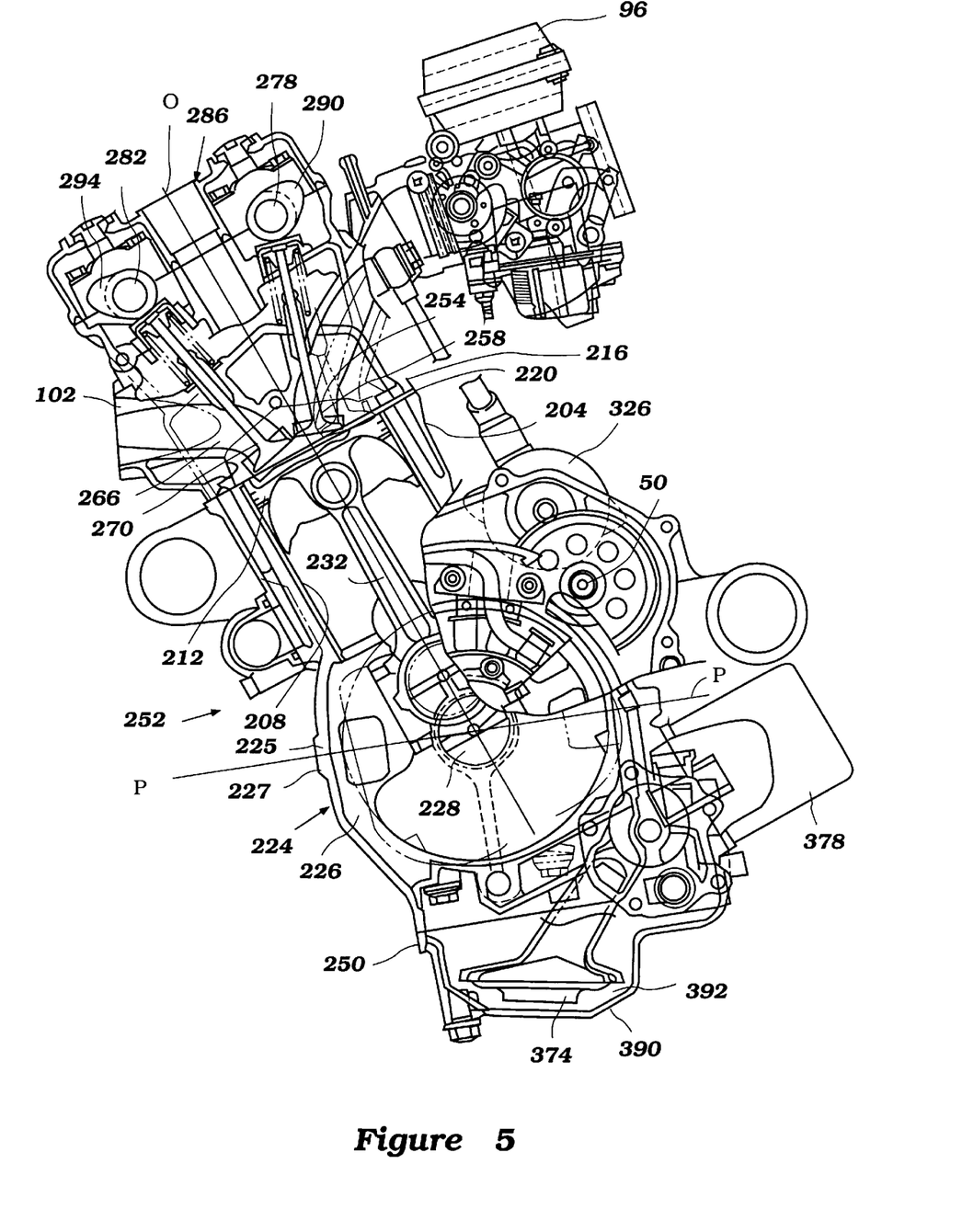
FIG. 5 is a side view of the engine showing the side opposite that shown in FIG. 3.

With reference to FIG. 5, the engine 28 also includes an air induction system configured to guide air into the combustion chamber 220. In the illustrated embodiment, the air induction system includes eight (8) intake ports 254 defined in the cylinder head member 216, two per combustion chamber 220. The intake ports 254 communicate with the associated combustion chambers 220. Intake valves 258 are provided to selectively connect and disconnect the intake port 254 with the combustion chambers 220. That is, the intake valves 258 selectively open and close the intake ports 254.

As discussed above, the charge former 96 is in communication with the air intake box 92 and is also in communication with a fuel system to produce an air fuel mixture appropriate for the running conditions of the engine 28 in a known manner. As such, the charge former 92 delivers the mixed air fuel charge to the combustion chamber 220 when the intake ports 254 are opened to the combustion chambers 220 by the intake valves 258.

The engine 28 further includes an ignition system. With reference to FIG. 4, spark plugs 262, at least one for each of the combustion chambers 220, are affixed to the cylinder head member 216 so that electrodes, which are defined at one end of the spark plugs 262, are exposed to the respective combustion chambers 220. Spark plugs 262 preferably are fired in a conventional manner. The air/fuel charge is combusted during every combustion stroke accordingly.

The engine 28 also includes an exhaust system 100, discussed above in connection with FIG. 1, to discharge burnt charges, i.e., exhaust gases, from the combustion chambers 220. With reference to FIGS. 4–5, the exhaust system 100 includes twelve (12) exhaust ports 266, three for each of the combustion chambers 220. The exhaust ports 266 are defined in the cylinder head member 216 and communicate with the associated combustion chambers 220. Exhaust valves 270 are provided to selectively connect and disconnect the exhaust ports 266 with the combustion chambers 220. That is, the exhaust valves 270 selectively open and close the exhaust ports 266. The exhaust ports 266 communicate with the exhaust runner 102 and the exhaust gases are eliminated in a manner discussed above.

With reference to FIGS. 3, 4, 5 and 7, the engine 28 has a valvetrain for actuating the intake and exhaust valves 258, 270. In the illustrated embodiment, a double overhead cam-type valvetrain is employed. That is, an intake cam shaft 278 actuates the intake valves 258 and an exhaust cam shaft 282 separately actuates the exhaust valves 270. The intake cam shaft 278 extends generally horizontally over the intake valves 258 transversely across to the vertical center plane of the snowmobile 20, and the exhaust cam shaft 282 extends generally horizontally over the exhaust valves 270 transversely across the vertical center plane of the snowmobile 20.

Both the intake and exhaust cam shafts 278, 282 are journaled by the cylinder head member 216 with a plurality of cam shaft caps (not shown). The cam shaft caps holding the cam shafts 278, 282 are affixed to the cylinder head member 216. A cylinder head cover member 286 extends over the cam shafts 278, 282 and the cam shaft caps, and is affixed to the cylinder head member 216 to define a cam shaft chamber.

The intake cam shaft 278 has cam lobes 290 associated with respective intake valves 258, and the exhaust cam shaft 280 also has cam lobes 294 associated with the respective exhaust valves 270. The intake and exhaust valves 258, 270 normally close the intake and exhaust ports 254, 266 by a biasing force of springs. When the intake and exhaust cam shafts 278, 282 rotate, the cam lobes 290, 294 push the respective valves 258, 270 to open the respective ports 254, 266 by overcoming the biasing force of the spring. The air thus can enter the combustion chambers 220 when the intake valves 258 open. In the same manner, the exhaust gases can move out from the combustion chambers 220 when the exhaust valves 270 open.

The crankshaft 228 preferably drives the intake and exhaust camshafts 278, 282 via a valvetrain drive 298. The valvetrain drive 298 includes an intake camshaft sprocket 302, an exhaust camshaft sprocket 306, a drive sprocket 310, and a flexible transmitter 314. In the illustrated embodiment, the flexible transmitter 314 is a timing chain.

The intake camshaft sprocket 302 is connected to the intake camshaft 278. The exhaust cam shaft sprocket 306, in turn, is connected to the exhaust cam shaft 282. The flexible transmitter 314 is wound around the drive sprocket 310 and the driven sprockets 302 and 306. One of ordinary skill will appreciate that a belt and pulley arrangement can also be used in place of the flexible transmitter 314 and sprockets 302, 306, 310.

The drive sprocket 310 and flexible transmitter 314 both reside within the valvetrain drive chamber 318. A tensioner 322 is configured to maintain tension in the flexible transmitter 314 during operation.

When the crankshaft 228 rotates, the drive sprocket 310 drives the driven sprockets 302, 306 via the flexible transmitter 314, and thus intake and exhaust cam shafts 278, 282 also rotate. The rotational speed of the cam shafts 278, 282 are reduced to half of the rotational speed of the crankshaft 228 because of the difference in diameters of the drive and driven sprockets.

In operation ambient air enters the engine cavity 26 through ventilation openings 90 defined in the cover 24. The air is then introduced into a plenum chamber defined by intake box 92 through the air inlet 93. The air is drawn into charge formers 96. The majority of the air in the air intake box 92 is supplied to the combustion chambers 220.

The charge formers 96 regulate an amount of air permitted to pass to the combustion chambers 220 in a known manner, e.g., with throttle valves. The opening angles of the throttle valves are controlled by the rider via the throttle lever and thus controls the air flow across the valves. The air hence flows into the combustion chambers 220 when the intake valves 258 open. At the same time, the charge formers 96 introduce an air/fuel mixture into the intake ports 254 under the control of an electronic control unit, or ECU. Air/fuel charges are thus formed and delivered to the combustion chambers 220.

The air/fuel charges are fired by the spark plugs 262 under the control of the ECU. The burnt charges, i.e., exhaust gases, are discharged to the atmosphere surrounding the snowmobile 20 through the exhaust system 100 as discussed above.

The combustion of the air/fuel charge causes the pistons 212 to reciprocate and thus causes the crankshaft 228 to rotate. The crankshaft 228 drives the output shaft 50, which in turn drives the transfer shaft 62. The rotation of the transfer shaft 62 is transmitted to the drive belt 70. The rider steers the skis 44 by the handlebar 42 as discussed in more detail below. The snowmobile 20 thus moves as the rider desires.

The engine 28 also includes other components relating to the engine operations. With reference to FIG. 4 the engine employs a flywheel magneto or AC generator 324 as one of such engine components. The flywheel magneto 324 generates electric power that is used for the engine operation as well as for electrical accessories associated with the snowmobile 20. The flywheel magneto 324 is located on one lateral side of the engine 28 and is enclosed by a flywheel magneto housing 325. A starter motor 326 (FIG. 2) rotates the crankshaft 228 for starting the engine 28 in a manner well known to those of ordinary skill in the art. The starter motor may be powered by a battery 327 that is mounted to the frame 22 of the snowmobile 20 above at least a portion of the engine 28 (see FIGS. 7 and 8). In one embodiment, the starter motor 326 is positioned on one side of the transverse center plane TCP of the engine 28 and the output shaft 50 is positioned on the other side thereof.

Figure 6:
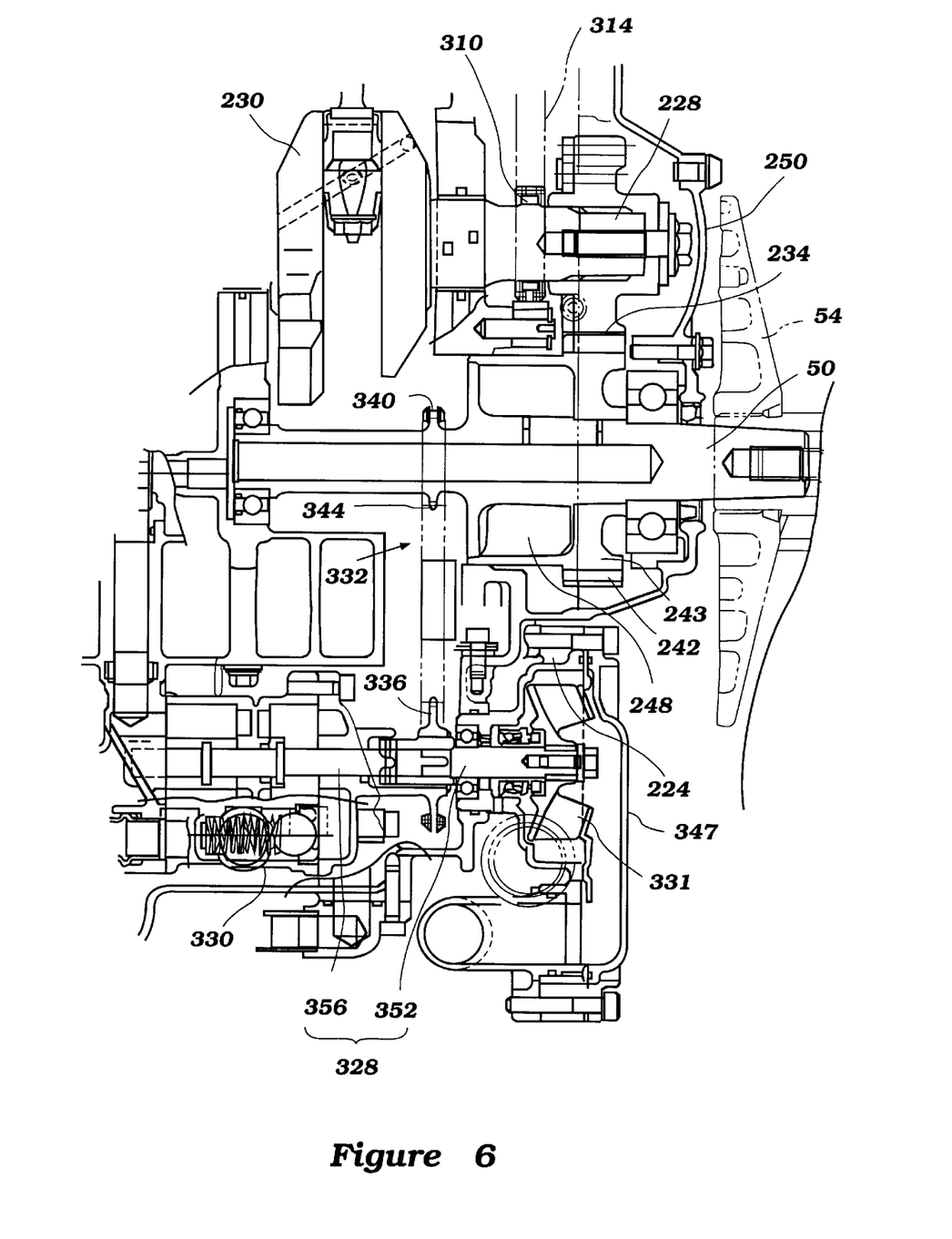
FIG. 6 is an enlarged cross-sectional view of the side portion of the engine shown in FIG. 4.

With reference to FIGS. 4 and 6, the engine 28 of the snowmobile 20 also comprises an auxiliary shaft 328 journaled in the crankcase 224 that rotates about an axis "C" that is generally parallel to the axis "A" (see FIG. 3). The auxiliary shaft 328 drives an oil pump 330 and a coolant pump 331. The output shaft 50 preferably drives the auxiliary shaft 328 via an auxiliary drivetrain 332. The auxiliary drivetrain 332 includes an auxiliary shaft sprocket 336, an output shaft sprocket 340, and an auxiliary flexible transmitter 344. The auxiliary shaft sprocket 336 is connected to the auxiliary shaft 328. In the illustrated embodiment, the auxiliary flexible transmitter 344 is a chain.

An oil pump housing 345 is provided on the crankcase member 224 to at least partially house the oil pump 330. A coolant pump housing 346 is provided proximate the oil pump housing 345 to at least partially house the coolant pump 331. A coolant pump housing cover 347 is provided on one side of the crankcase 224 to enclose at least the coolant pump 331 and the auxiliary shaft 328.

The auxiliary shaft 328 includes a water pump drive shaft 352 and an oil pump drive shaft 356. The auxiliary flexible transmitter 344 is wound around the auxiliary shaft sprocket 336 and the output shaft sprocket 340. One of ordinary skill will appreciate that a belt and pulley arrangement can also be used in place of the flexible transmitter 344 and sprockets 336, 340.

When the output shaft 50 rotates, the output shaft sprocket 340 drives the auxiliary shaft sprocket 336 via the flexible transmitter 344, and thus the auxiliary shaft 328 also rotates. This rotational motion drives the oil pump 330, which supplies oil to a lubrication system described below. The rotational motion of the auxiliary shaft 350 also drives the coolant pump 331, which circulates coolant through a cooling system described below.

With reference to FIG. 3, the arrangement of the various components of the engine 28 provide a compact layout. For example, in one embodiment, the crankshaft axis "A" is a first axis, the output shaft axis "B" is a second axis, and the auxiliary shaft axis "C" is a third axis. Two of the first axis, the second axis, and the third axis are disposed in a common plane. The other of the first axis, the second axis, and the third axis is offset from the common plane. In one embodiment, as illustrated in FIG. 3, the axis "A" is positioned in the plane P—P. The axis "B" is positioned above the plane P—P and the axis "C" is positioned below the axis P—P, but in the same plane as axis "B." As discussed in more detail below, this arrangement enables the engine 28 to be positioned within the engine compartment 26 without interfering with the operation of a steering linkage assembly 420 of the snowmobile 20.

The engine 28 of the snowmobile 20 includes a lubrication system for lubricating various components of the engine 28. The lubrication system includes the oil pump 330, and also includes an oil tank 370, an oil strainer 374, an oil filter 378, and an oil cooler 382.

With reference to FIG. 5, the crankcase cover 250 forms, at least in part, a shallow reservoir 390. Because the cylinder bore axes of the engine 28 are inclined with respect to the vertical direction, lubricant which drains downward through the engine body 252 to the crankcase cover 250, tends to collect in the lowermost region of the engine body 252. Thus, oil draining through the engine body 252 collects along an engine lubricant area 386. The oil pump 330 then draws oil from the lubricant area 386 through the oil strainer 374.

Figure 8:
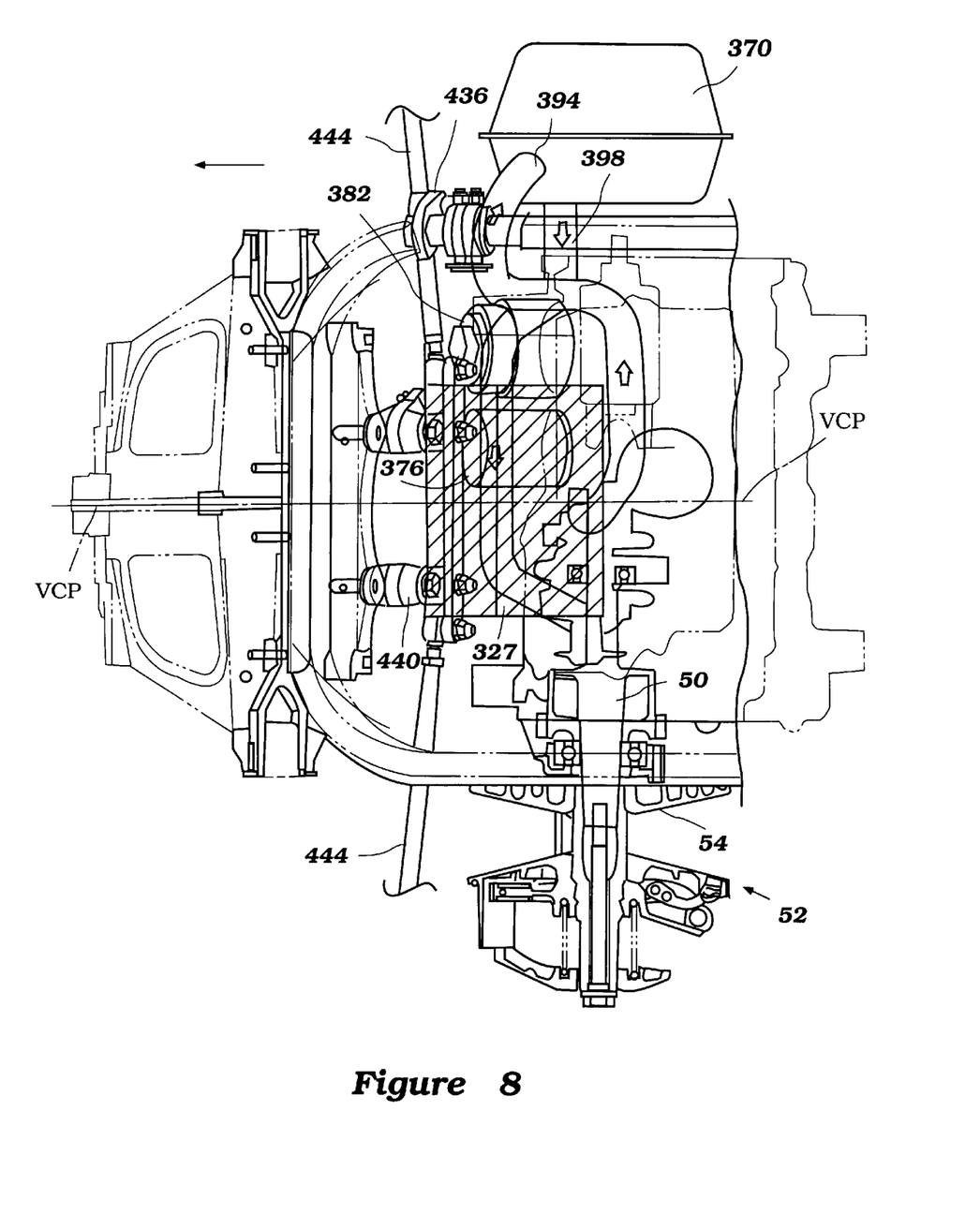
FIG. 8 is a partial top plan view of the snowmobile of FIG. 1.

With reference to FIG. 8, the oil pump 330 discharges the oil through an oil conduit 394 to the oil tank 370. The oil pump 330 then pumps oil from a second oil conduit 398 and from the oil tank 370 into the oil cooler 382. The oil pump 330 generates pressure that forces the oil from the oil cooler 382 into the oil filter 378. The pump 376 then forces the oil into various passages that supply oil to moving components such as the pistons 212, the shafts 50, 228, 328, etc. The oil then flows down through the inclined engine body 252 as described above, and again collects in the engine lubricant area 392. Thus, the pump 330 serves as a scavenge oil pump and the passage 394 serves as a supply conduit to the oil tank 370.

In some embodiments, an advantageous lubrication system layout is provided. For example, in one embodiment, the oil filter 378 and the oil cooler 382 are positioned on one side of the transverse center plane TCP of the engine 28 and the oil pump 330 is positioned on the other side of the plane TCP. In another embodiment, the oil filter 378 is located at least partially in the same horizontal plane as the third axis "C." In another embodiment, the oil cooler 382 is located at least partially in the same horizontal plane as the third axis "C." In one embodiment, both the oil filter 378 and the oil cooler 382 are located at least partially in the same horizontal plane as the third axis "C."

The engine 28 further includes a cooling system that includes the coolant pump 331, a coolant conduit 406 and a plurality of coolant jackets defined, for example, in the cylinder block 204 and the cylinder head 216. The cooling system is configured to circulate coolant into thermal communication with at least one component within the snowmobile 20. Preferably, the cooling system is a closed-type liquid cooling system, circulating coolant into thermal communication with heat generating components within the snowmobile 20. However, other types of cooling systems can be used, such as, for example, without limitation, air-cooling types.

Figure 7:
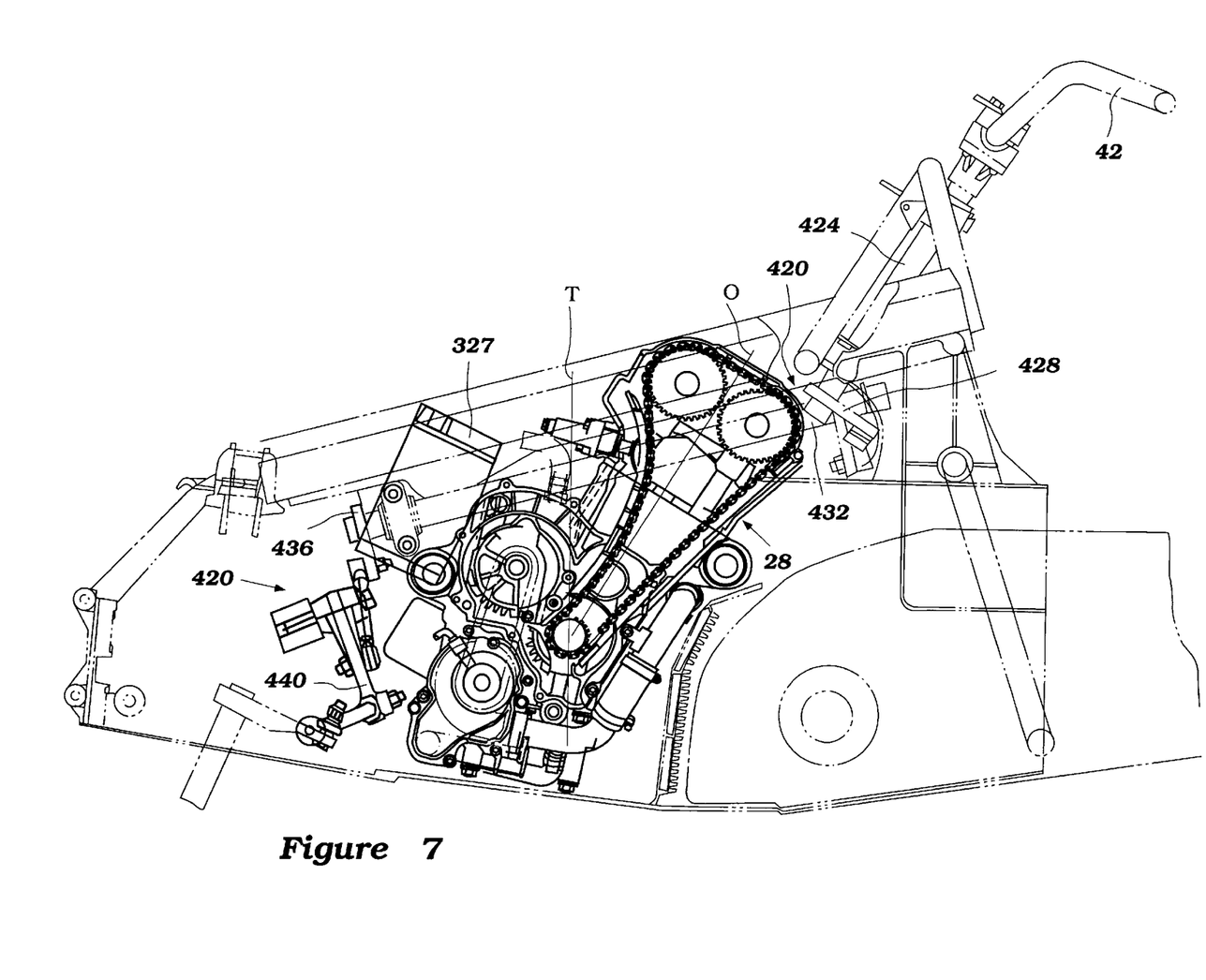
FIG. 7 is a partial view of the snowmobile of FIG. 1 showing the mounting of the engine, with a portion of the snowmobile frame and a portion of the steering mechanism shown in phantom.

With reference to FIGS. 7 and 8, the handlebar assembly 42 is coupled to a pair of front skis 44 by a steering linkage assembly 420. The steering linkage assembly 420 includes a steering shaft 424, a first link plate 428, a connection member 432, a second link plate 436, a pair of arm pivots 440, and a pair of tie rods 444. The handlebar assembly is coupled to the top end of the steering shaft 424, which is oriented at an incline, the top end being rearward of the bottom end. The bottom end of the steering shaft 424 is coupled to the first link plate 428, which is connected to the rearward end of the connection member 432 by a link member. The forward end of the connection member 432 is connected to the second link plate 436. The second link plate 436 is connected to a right arm pivot 440 by a link member. As used herein, right is defined from the forward-facing perspective. The right pivot arm 440 is connected to the left pivot arm by a link. A right tie rod 444 is connected to a right pivot arm 440 and extends outwardly to a right ski 44. A left tie rod 444 is connected to a left pivot arm 440 and extends outwardly to a left ski 44.

To steer the snowmobile 20 toward the left, a rider rotates the handlebar assembly 42 counterclockwise (as viewed from above), which causes the steering shaft 424 to rotate counterclockwise. The counterclockwise rotation of the steering shaft 424 causes the first link plate 428 to rotate in the counterclockwise direction. The counterclockwise rotation of the link plate 428 causes a link member between the first link plate 428 and the connection member 432 to translate toward the right side of the snowmobile 20. The translation causes the connection member 432 to rotate in the counterclockwise direction. This counterclockwise rotation causes the second link plate 436 to rotate in the counterclockwise direction, which causes the link member between the link plate 436 and the pivot arm 440 to translate toward the left side of the snowmobile 20. This translation causes the pivot arm 440 to rotate in a counterclockwise direction. Because the pivot arms 440 are connected by links to the tie rods 444, the rotation of the arm pivots 440 causes the tie rods to translate toward the right side of the vehicle. The tie rods 444 are connected to the skis 44 rearward of a pivot that interconnects the ski 44 and the frame 22. When the tie rods 444 move toward the right, the skis 44 pivot in a counterclockwise direction, which causes the snowmobile to be directed toward the left. Similarly, a rightward turn is achieved by rotation of the handlebar assembly 42 in the clockwise direction.

As discussed above, some embodiments discussed herein, e.g., as illustrated in FIG. 3, provide a very compact arrangement. As can be more clearly seen in FIGS. 7 and 8 this compact arrangement enables the snowmobile 20 to accommodate the engine 28 within the engine compartment 26, while at the same time providing adequate clearance for the steering linkage 420. In this way, these and other components, such as the battery 327, can be accommodated within the small space of the engine compartment 26.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A snowmobile comprising a frame assembly having a longitudinal axis, a steering linkage mounted to the frame assembly, an internal combustion engine mounted generally transversely to the frame assembly, the engine comprising a cylinder bore, a piston reciprocally positioned in said cylinder bore, said piston driving a crankshaft of said engine, said crankshaft being mounted in a crankcase having a vertical transverse center plane, said crankshaft extending along a first axis, said crankshaft being arranged to drive an output shaft, said output shaft being mounted in said crankcase, said output shaft extending along a second axis that is generally parallel to said first axis, said output shaft being arranged to drive the vehicle through a transmission, an auxiliary shaft arranged to drive an oil pump to deliver lubricating oil to at least one component of said engine, said auxiliary shaft extending along a third axis that is generally parallel to said first axis, an oil cooler and an oil filter, wherein said oil pump is located on one side of said transverse center plane, said oil filter and said oil cooler are located on the other side of said transverse center plane, wherein two of said first axis, said second axis, and said third axis are disposed in a common plane and the other of said first axis, said second axis, and said third axis is offset from the common plane.

2. The snowmobile of claim 1, wherein said oil filter is located at least partially at the same elevation as the third axis.

3. The snowmobile of claim 1, wherein said oil cooler is located at least partially at the same elevation as the third axis.

4. The snowmobile of claim 3, wherein said oil filter is located at least partially at the same elevation as the third axis.

5. The snowmobile of claim 1, further comprising a starter motor, wherein said output shaft is located on one side of said transverse center plane, and said starter motor is located on the other side of said transverse center plane.

6. The snowmobile of claim 1, further comprising a plurality of cylinder bores arranged generally parallel to said first axis, a plurality of crank webs arranged on said crankshaft along the first axis, a drive gear located on said crankshaft driving said output shaft, a driven on said output shaft to which rotational power of said crankshaft is transmitted, and a damper on said output shaft positioned at a location between said drive gear and said plurality of crank webs.

7. The snowmobile of claim 1, further comprising a battery mounted to said frame, wherein said steering linkage is located at least partially below said battery.

8. A snowmobile comprising a frame assembly having a longitudinal axis, a steering linkage mounted to the frame assembly, an internal combustion engine mounted generally transversely to the frame assembly, the engine comprising a cylinder bore, a piston reciprocally positioned in said cylinder bore, said piston driving a crankshaft of said engine, said crankshaft being mounted in a crankcase having a vertical transverse center plane, said crankshaft extending along a first axis, said crankshaft being arranged to drive an output shaft, said output shaft being mounted in said crankcase, said output shaft extending along a second axis that is generally parallel to said first axis, said output shaft being arranged to drive the vehicle through a transmission, an auxiliary shaft arranged to drive an oil pump to deliver lubricating oil to at least one component of said engine, said auxiliary shaft extending along a third axis that is generally parallel to said first axis, and a starter motor, wherein said output shaft is located on one side of said transverse center plane, and said starter motor is located on the other side of said transverse center plane, and wherein two of said first axis, said second axis, and said third axis are disposed in a common plane and the other of said first axis, said second axis, and said third axis is offset from the common plane.

9. The snowmobile of claim 8 further comprising a plurality of cylinder bores arranged generally parallel to said first axis, a plurality of crank webs arranged on said crankshaft along the first axis, a drive gear located on said crankshaft driving said output shaft, a driven gear on said output shaft to which rotational power of said crankshaft is transmitted, and a damper on said output shaft positioned at a location between said drive gear and said plurality of crank webs.

10. A snowmobile comprising a frame assembly having a longitudinal axis, a steering linkage mounted to the frame assembly, an internal combustion engine mounted generally transversely to the frame assembly, the engine comprising a cylinder bore, a piston reciprocally positioned in said cylinder bore, said piston driving a crankshaft of said engine, said crankshaft being mounted in a crankcase having a vertical transverse center plane, said crankshaft extending along a first axis, said crankshaft being arranged to drive an output shaft, said output shaft being mounted in said crankcase, said output shaft extending along a second axis that is generally parallel to said first axis, said output shaft being arranged to drive the vehicle through a transmission, an auxiliary shaft arranged to drive an oil pump to deliver lubricating oil to at least one component of said engine, said auxiliary shaft extending along a third axis that is generally parallel to said first axis, a plurality of cylinder bores arranged generally parallel to said first axis, a plurality of crank webs arranged on said crankshaft along the first axis, a drive gear located on said crankshaft driving said output shaft, a driven gear on said output shaft to which rotational power of said crankshaft is transmitted, and a damper on said output shaft positioned at a transverse location between said drive gear and said plurality of crank webs, wherein two of said first axis, said second axis, and said third axis are disposed in a common plane and the other of said first axis, said second axis, and said third axis is offset from the common plane.

11. A snowmobile comprising a frame assembly having a longitudinal axis, a steering linkage mounted to the frame assembly, an internal combustion engine mounted generally transversely to the frame assembly, the engine comprising a cylinder bore, a piston reciprocally positioned in said cylinder bore, said piston driving a crankshaft of said engine, said crankshaft being mounted in a crankcase having a vertical transverse center plane, said crankshaft extending along a first axis, said crankshaft being arranged to drive an output shaft, said output shaft being mounted in said crankcase, said output shaft extending along a second axis that is generally parallel to said first axis, said output shaft being arranged to drive the vehicle through a transmission, an auxiliary shaft arranged to drive an oil pump to deliver lubricating oil to at least one component of said engine, said auxiliary shaft extending along a third axis that is generally parallel to said first axis, and a drive gear affixed to one end of said crankshaft, said drive gear being located farther from the transverse center plane than a majority of said output shaft, wherein two of said first axis, said second axis, and said third axis are disposed in a common plane and the other of said first axis, said second axis, and said third axis is offset from the common plane.

12. The snowmobile of claim 11, wherein said drive gear is located farther from the transverse center plane than a majority of said output shaft.

13. A snowmobile comprising a frame assembly having a longitudinal axis, a steering linkage mounted to the frame assembly, an internal combustion engine mounted generally transversely to the frame assembly, the engine comprising a cylinder bore, a piston reciprocally positioned in said cylinder bore, said piston driving a crankshaft of said engine, said crankshaft being mounted in a crankcase having a vertical transverse center plane, said crankshaft extending along a first axis, said crankshaft being arranged to drive an output shaft, said output shaft being mounted in said crankcase, said output shaft extending along a second axis that is generally parallel to said first axis, said output shaft being arranged to drive the vehicle through a transmission, an auxiliary shaft arranged to drive an oil pump to deliver lubricating oil to at least one component of said engine, said auxiliary shaft extending along a third axis that is generally parallel to said first axis, and a drive gear affixed to one end of said crankshaft, said drive gear being located farther from the transverse center plane than a majority of said auxiliary shaft, wherein two of said first axis, said second axis, and said third axis are disposed in a common plane and the other of said first axis, said second axis, and said third axis is offset from the common plane.

14. A snowmobile comprising a frame assembly having a longitudinal axis, an internal combustion engine mounted generally transversely to the frame assembly, the engine comprising a cylinder bore, a piston reciprocally positioned in said cylinder bore, said piston driving a crankshaft of said engine, said crankshaft being mounted in a crankcase having a vertical transverse center plane, said crankshaft being arranged to drive an output shaft, said output shaft being mounted in said crankcase, said output shaft being arranged to drive the vehicle through a transmission, a starter motor, and a lubrication system including an oil cooler, an oil filter, and an oil pump to deliver lubricating oil to at least one component of said engine, wherein said oil pump and said output shaft are located on one side of the transverse center plane, said oil filter, said oil cooler, and said starter motor are located on the other side of said transverse center plane.

15. The snowmobile of claim 14, further comprising an auxiliary shaft arranged to drive said oil pump, said auxiliary shaft extending along a third axis, said oil filter and said oil cooler are located at least partially at the same elevation as the third axis.

16. A snowmobile comprising a frame assembly having a longitudinal axis, an internal combustion engine mounted generally transversely to the frame assembly, the engine comprising a cylinder bore, a piston reciprocally positioned in said cylinder bore, said piston driving a crankshaft of said engine, said crankshaft comprising at least one crank web and driving a drive gear, said crankshaft being mounted in a crankcase having a vertical transverse center plane, said crankshaft being arranged to drive an output shaft through said drive gear, said output shaft being mounted in said crankcase, a driven gear mounted on said output shaft configured to be driven by said drive gear, a damper mounted on said output shaft, a valvetrain including a flexible transmitter that causes a plurality of valves to be actuated, wherein said damper is positioned at a transverse location between said drive gear and said crank web, and said damper is at least partially positioned in a plane that is normal to an axis of rotation of the crankshaft and that includes a portion of the flexible transmitter.

* * * * *